US009075875B1

(12) United States Patent
Maddison

(10) Patent No.: US 9,075,875 B1
(45) Date of Patent: Jul. 7, 2015

(54) SYSTEM AND METHOD FOR RECOMMENDING TELEVISION PROGRAMS BASED ON USER SEARCH QUERIES

(75) Inventor: Kyle Maddison, London (GB)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/174,482

(22) Filed: Jun. 30, 2011

Related U.S. Application Data

(60) Provisional application No. 61/486,178, filed on May 13, 2011.

(51) Int. Cl.
G06F 17/30 (2006.01)

(52) U.S. Cl.
CPC .................................. G06F 17/30781 (2013.01)

(58) Field of Classification Search
CPC ............... G06F 17/30781; G06F 17/30823; G06F 17/30828; G06F 17/30837; G06F 17/3084
USPC ......... 707/705, 722, 728, 729, 731, 758, 770, 707/771, 732; 725/37, 44, 45, 46, 52
See application file for complete search history.

(56) References Cited

U.S. PATENT DOCUMENTS

| 7,403,939 B1 | 7/2008 | Virdy |
| 2003/0172382 A1 | 9/2003 | Kim |
| 2004/0199502 A1 | 10/2004 | Wong et al. |
| 2007/0162502 A1 | 7/2007 | Thomas et al. |
| 2007/0239675 A1 | 10/2007 | Ragno et al. |
| 2007/0255703 A1 | 11/2007 | Maruyama et al. |
| 2008/0098432 A1 | 4/2008 | Hardacker et al. |
| 2008/0133504 A1 | 6/2008 | Messer et al. |

(Continued)

FOREIGN PATENT DOCUMENTS

| EP | 0848554 | 6/1998 |
| WO | WO 00/78041 A1 | 12/2000 |
| WO | WO 03/096669 | 11/2003 |

OTHER PUBLICATIONS

Google Inc., International Search Report and Written Opinion, PCT/US2012/037586, Nov. 30, 2012, 10 pgs.

(Continued)

*Primary Examiner* — Hares Jami
(74) *Attorney, Agent, or Firm* — Morgan, Lewis & Bockius LLP

(57) ABSTRACT

A computer implemented method for recommending television programs based on search queries. The method is performed at a server, the server including a plurality of processors and storage and having access to a database of television program related information. The server receives from an electronic device search terms during a time window. The server determines one or more categories of interest associated with the received search query. The server then determines, in accordance with a location associated with the electronic device and the categories determined to be of interest in accordance with the received search query, at least one television program from a plurality of television programs available during the time window. The server then sends a recommendation to the electronic device to view the determined television program, in accordance with a determination that at least one television program is available and is sufficiently related to the determined categories of interests.

11 Claims, 11 Drawing Sheets

(56) References Cited

U.S. PATENT DOCUMENTS

| | | |
|---|---|---|
| 2008/0163048 A1 | 7/2008 | Gossweiler, III et al. |
| 2008/0235209 A1 | 9/2008 | Rathod et al. |
| 2009/0055385 A1* | 2/2009 | Jeon et al. .......................... 707/5 |
| 2009/0112848 A1 | 4/2009 | Kunjithapatham et al. |
| 2010/0186041 A1* | 7/2010 | Chu et al. ......................... 725/46 |
| 2012/0096488 A1* | 4/2012 | Wei et al. ........................ 725/34 |
| 2012/0240166 A1* | 9/2012 | Xu .................................. 725/50 |
| 2013/0035086 A1* | 2/2013 | Chardon et al. .............. 455/420 |

OTHER PUBLICATIONS

Google Inc., Supplementary European Search Report, EP 12785358.8, Sep. 22, 2014, 7 pgs.

Gui et al., A Contextualized and Personalized Approach for Mobile Search, WAINA '09, Piscataway, NJ, May 26, 2009, pp. 966-971.

\* cited by examiner

SYSTEM AND METHOD FOR RECOMMENDING TELEVISION PROGRAMS BASED ON USER SEARCH QUERIES

RELATED APPLICATIONS

This application claims priority to U.S. Provisional Application Ser. No. 61/486,178, filed May 13, 2011, entitled "System and Method for Enhancing User Search Results by Determining a Television Program Currently Being Displayed in Proximity to an Electronic Device", which is incorporated by reference herein in its entirety.

TECHNICAL FIELD

The disclosed implementations relate generally to the field of search enhancement, and in particular to determining a television program being displayed in proximity to an electronic device and using that determination to return improved search results.

BACKGROUND

Search engines provide a powerful tool for locating content in documents in a large database of documents, such as the documents on the Internet or World Wide Web (WWW), and/or the documents stored on the computers of an Intranet. The documents are located using an index of documents in response to a search query, consisting of one or more words, terms, keywords and/or phrases, henceforth called terms, that are submitted by a user. Documents in the index of documents may be matched to one or more terms in the search query to determine scores. A ranked listing of relevant documents or document locations, based on the scores, is provided to the user.

Users, when using search engines to find relevant documents, desire the most relevant results to be presented first. Search engines use a variety of methods to more accurately determine which documents in a group of documents are the most relevant to a particular query. Some methods include personalizing results based on user profiles, ranking results based on a specific location or set of locations and using search query trend data to improve results. Accordingly, methods that enhance the accuracy of search results are useful to search engines and their users.

SUMMARY

Some implementations are directed to a computer implemented method for using search queries related to television programs. The method is performed at a server, the server including a plurality of processors and storage and having access to a database of television program related information. The server receives a user's search query from an electronic device. The server then determines, in accordance with the search query and television program related information for television programs available at a location associated with the electronic device during a specific time window, a television program currently being displayed in proximity to the electronic device, wherein the television program related information includes program descriptions for a plurality of television programs being broadcast for the associated location.

According to some implementations, a computer implemented method modifies a search query based on a television program. The method is performed at a server, the server including a plurality of processors and storage and having access to a database of television program related information. The server receives a user's search query from an electronic device. The server then modifies the search query based on a television program being displayed in proximity to the electronic device.

According to some implementations, a computer implemented method recommends TV programs based on search queries. The method is performed at a server, the server including a plurality of processors and storage and having access to a database of television program related information. The server receives from an electronic device search terms during a time window. The server determines one or more categories of interest associated with the received search query. The server then determines, in accordance with a location associated with the electronic device and the categories determined to be of interest in accordance with the received search query, at least one television program from a plurality of television programs available during the time window. The server then sends a recommendation to the electronic device to view the determined television program, in accordance with a determination that at least one television program is available and is sufficiently related to the determined categories of interests According to some implementations, a server system for using search queries related to television programs is disclosed, the server system having one or more central processing units for executing programs and memory storing one or more programs to be executed by the one or more central processing units. The one or more programs include instructions for: receiving a user's search query from an electronic device, and determining, in accordance with the search query and television program related information for television programs available at a location associated with the electronic device during a specific time window, a television program currently being displayed in proximity to the electronic device, wherein the television program related information includes program descriptions for a plurality of television programs being broadcast for the associated location.

In accordance with some implementations, a non-transitory computer readable storage medium storing one or more programs configured for execution by a computer is disclosed. The one or more programs comprise instructions for receiving a user's search query and determining, in accordance with the search query and television program related information for television programs available at a location associated with an electronic device during a specific time window, a television program currently being displayed in proximity to the electronic device, wherein the television program related information includes program descriptions for a plurality of television programs being broadcast for the associated location.

In accordance with some implementations, a server system for modifying a search query based on a determined television program is disclosed. The server system includes one or more central processing units for executing programs and memory storing one or more programs be executed by the one or more central processing units. The one or more programs comprise instructions for: receiving a user's search query from an electronic device and modifying the search query based on a television program being displayed in proximity to the electronic device.

In accordance with some implementations, a non-transitory computer readable storage medium storing one or more programs configured for execution by a computer is disclosed. The one or more programs comprise instructions for: receiving a user's search query from an electronic device and modifying the search query based on a television program being displayed in proximity to the electronic device.

In accordance with some implementations, a server system for recommending TV programs based on search queries is disclosed. The server system comprises one or more central processing units for executing programs and memory storing one or more programs be executed by the one or more central processing units. The one or more programs comprise instructions for: receiving from an electronic device search terms during a time window, determining one or more categories of interest in accordance with the received search query, determining, in accordance with a location associated with an electronic device and the categories determined to be of interest in accordance with the received search query, at least one television program from a plurality of television programs available during the time window, and sending to the electronic device a recommendation to view the determined television program, in accordance with a determination that at least one television program is available and is sufficiently related to the determined categories of interest.

In accordance with some implementations, a non-transitory computer readable storage medium storing one or more programs configured for execution by a computer is disclosed. The one or more programs comprise instructions for: receiving from an electronic device search terms during a time window; determining one or more categories of interest in accordance with the received search query; determining, in accordance with a location associated with the electronic device and the categories determined to be of interest in accordance with the received search query, at least one television program from a plurality of television programs available during the time window; and sending to the electronic device a recommendation to view the determined television program, in accordance with a determination that at least one television program is available and is sufficiently related to the determined categories of interest.

BRIEF DESCRIPTION OF THE DRAWINGS

Like reference numerals refer to corresponding parts throughout the drawings.

DESCRIPTION OF IMPLEMENTATIONS

Figure 1:
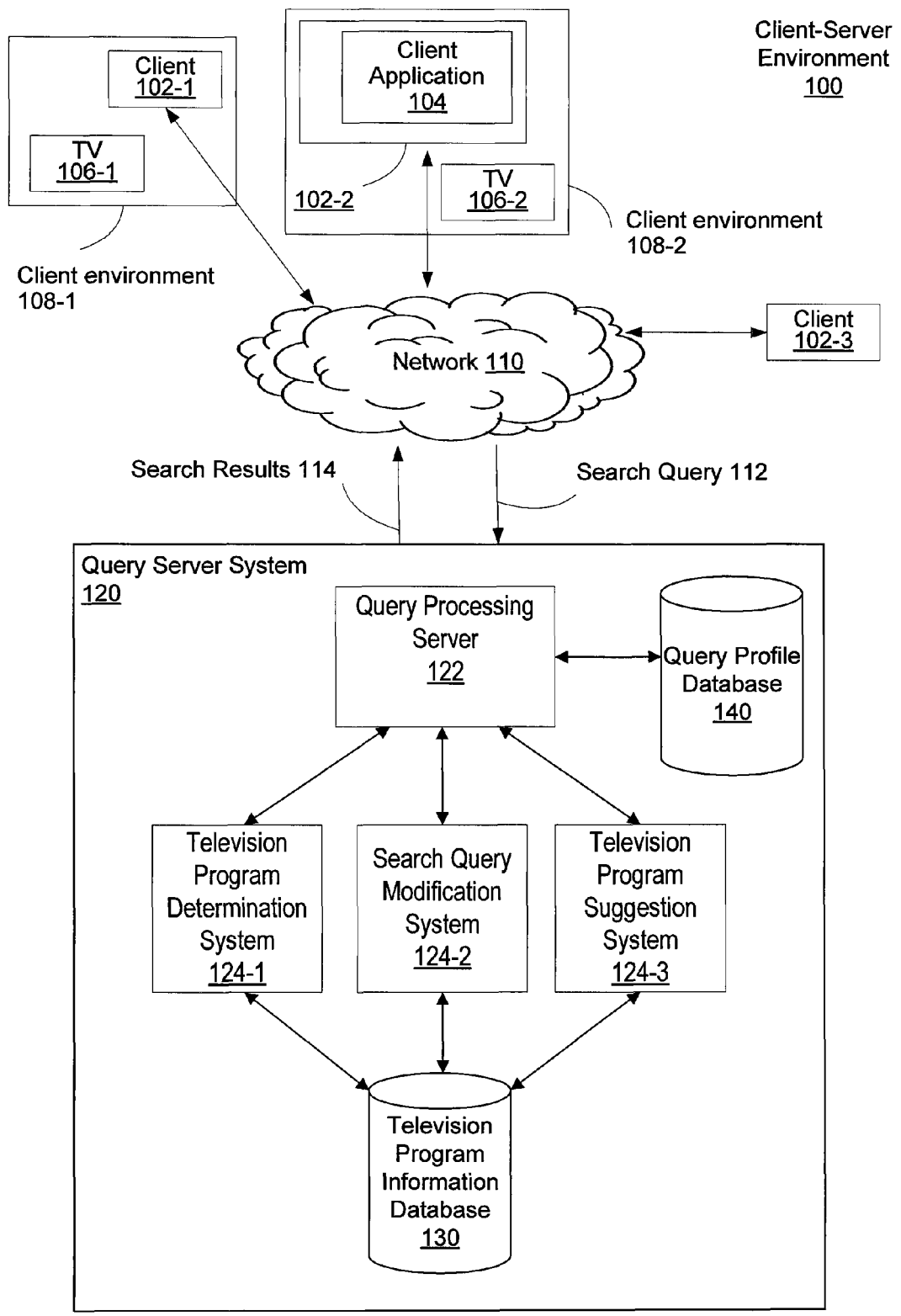
FIG. 1 is a block diagram illustrating a computer network that includes a query server system.

In some implementations, a TV viewer (sometimes referred to herein as a user) has access to a computer, set top box, smart phone, or other Internet-connected electronic device, while he or she is viewing TV content. Occasionally, such a TV viewer executes search queries on the Internet-connected device related to the TV content he or she is watching. For example, when the user is watching a TV program about wildlife, he or she might execute searches on the Internet-connected device related to the particular animal species being described in that program. As another example, a viewer who is watching a movie might execute searches about locations or the actors appearing in the movie. Such a viewer when entering a search query might use search terms that are related to but not identical to the particular content being described in the program he or she is viewing. For example, someone watching a TV program with a segment about a particular model of Porsche might execute a search query for "Porsche" or "sports cars" instead of the designation of the particular model that was the subject of the segment.

Some implementations leverage the fact that some TV viewers enter search queries during, and related to, TV programs they are viewing to improve the quality of the search results returned to such users. In some implementations, this improvement is provided by a search engine with access to comprehensive information about the content and geographic availability of TV programming for many different modes of live TV broadcasting (e.g., cable, over the air, satellite and Internet-streaming). In some implementations, a search engine compares a search query it receives to the content of TV programs that are presumably available to the user who executed the search query (based on the time the search query was submitted and a location associated with the user/the user's device). In some implementations, the search engine can determine the location of the user from a user profile or other information entered by the user. In some implementations, the search engine can determine the user's/device's location from the IP address of the Internet-connected device employed by the user or, depending on user settings and capabilities of the Internet-connected device employed by the user, location information associated with a GPS receiver in the Internet-connected device, a known location of a nearby WiFi transmitter, or a known location of a nearby mobile/cellular communication tower. When there is an acceptable degree of correlation between the program information and the user's search query (e.g., when the user executes a query for "Porsche" during the same time window a TV program is airing that includes a segment about a particular Porsche model), the search engine returns enhanced search results based on the presumption that the user in question was watching that particular TV program—or that the user in question would be interested in watching that particular TV program. For example, given that the Porsche model in question is a "911 Turbo," and that the user executed a search query for "Porsche," the server can return information about one or more of: 1) the "911 Turbo" model (e.g., a link to information on the Porsche.com website about the "911 Turbo"), 2) information about the TV program that is currently airing with that segment, and 3) suggestions of similar programming that is currently airing or airing in the future and that is available to the user. In this way, implementations provide enhanced search results to viewers of live TV that are relevant to the content of TV programs that they are watching or are likely to be interested in watching.

FIG. 1 is a block diagram illustrating a client-server environment 100 that includes a query server system 120, according to some implementations. The client-server environment 100 includes one or more client systems (also referred to herein as electronic devices) 102, one or more client environments 108 and a query-server system 120. One or more communications networks 110 interconnect these components. The communications network 110 may be any of a variety of networks, including local area networks (LAN), wide area networks (WAN), wireless networks, wired networks, the Internet, or a combination of such networks.

The client environment 108 includes a client system 102 and a television 106 according to some implementations. The client system 102 includes a client application 104, which is executed by the client system, for sending a query to the query server system 120. In some implementations, the client application 104 is selected from the set consisting of a search application, a search engine plug-in for a browser application, and a search engine extension for a browser application. In some implementations, the television 106 is replaced with any device enabled to display a television program, including a personal computer, laptop, or any other personal electronic device.

A client system 102 sends queries to and receives data from the query server system 120. The client system 102 may be any computer or other electronic device that is capable of communicating with the query server system 120. Examples include, without limitation, desktop and notebook computers, mainframe computers, server computers, mobile devices such as mobile phones, smart phones, and personal digital assistants, network terminals, and set-top boxes.

According to some implementations, the query server system 120 includes a query processing server 122, a query profile database 140, a television program information database, and several search enhancement systems 124. The search enhancement systems 124 include a television program determination system 124-1, a search expansion 124-2, and a television program suggestion system 124-3. The search server system 120 receives search queries 112 from one or more client systems 102 through the communication network 110 and returns search results 114 to one or more client systems 102 through the communication network 110. The query processing server 122 processes the search query 112 received from a client system 102. In some implementations, the query processing server 122 returns search results 114 to the client system 102. In some implementations, the query processing server 120 retrieves a query profile for the received search terms from the query profile database 140. In some implementations, the query processing server 122 sends the query to one of a plurality of search enhancement systems 124, as part of processing the query.

According to some implementations, the search enhancement systems 124 each implement a distinct search enhancement process and access the television program information database 130 as necessary to perform their distinct search enhancement process. For example, the determinations system 124-1 accesses the television program information database 130 to obtain a television program profile, containing information on television show times and interest categories related to the television program. In another example, the search expansion system 124-2 receives a search query and a determined television program from the query processing server. The search expansion system 124-2 then accesses the television program information database 130 to correctly expand the search query. This is explained in more detail in FIG. 7. The suggestion system 124-3 receives a search query from the query processing server 122 and accesses the television program information database 130 to determine television programs related to the received search query. The suggestion system 124-3 then returns a suggested television program to the query processing server 122, which would then relay the suggestion to the client system 102.

The client system 102 presents the one or more search results or suggestions to the user. The results may be presented on a display, by an audio speaker, or any other means used to communicate information to a user. The user may interact with the search results or the suggestion in a variety of ways. The user may interact with the search results via any number of input devices, including a mouse, a keyboard, a touch-sensitive display, voice enabled control systems etc.

Figure 2:
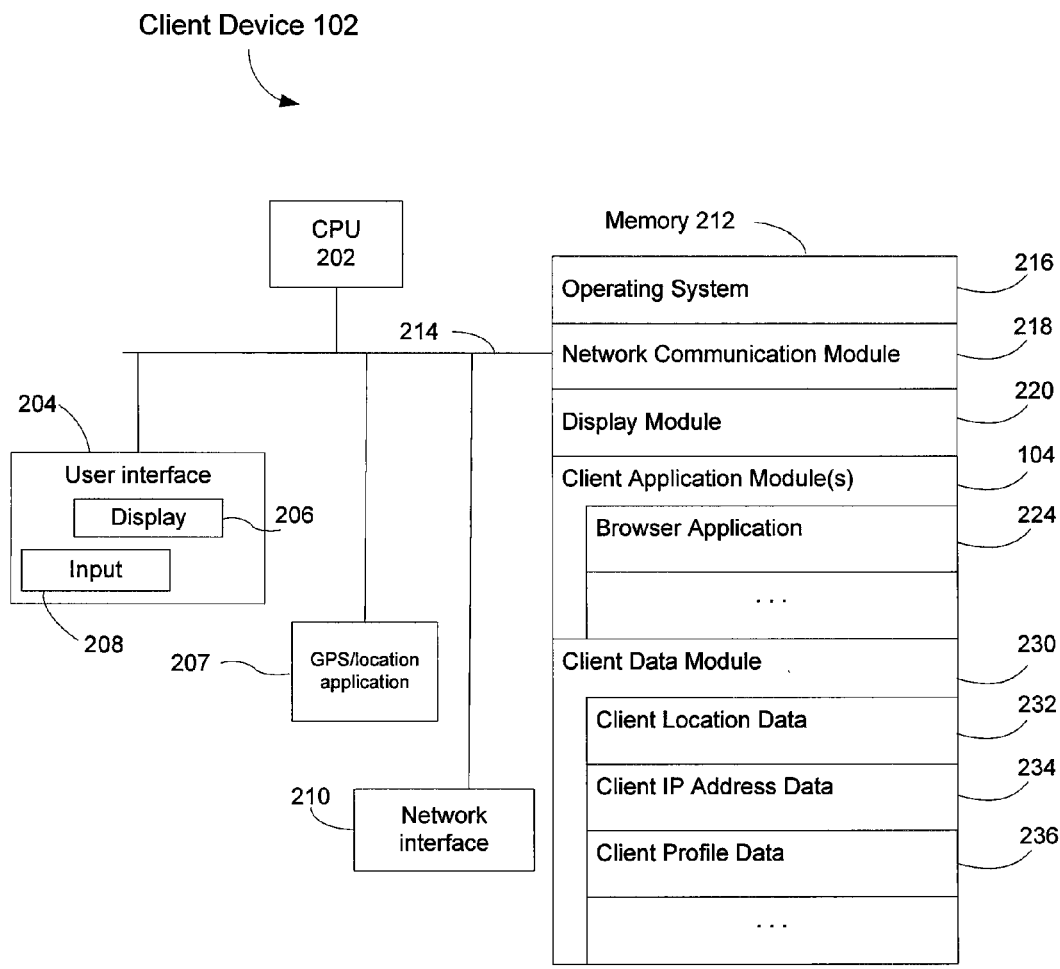
FIG. 2 is a block diagram illustrating a client system, in accordance with some implementations.

FIG. 2 is a block diagram illustrating a client system 102 in accordance with one implementation. The client system 102 typically includes one or more processing units (CPU's) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems use a microphone and voice recognition to supplement or replace the keyboard. Optionally, the client 102 includes a GPS (global positioning satellite) receiver, or other location detection apparatus 207 for determining the location of the client system 102. In some implementations, visual query search services are provided that require the client system 102 to provide the visual query server system to receive location information indicating the location of the client system 102.

Figure 3A:
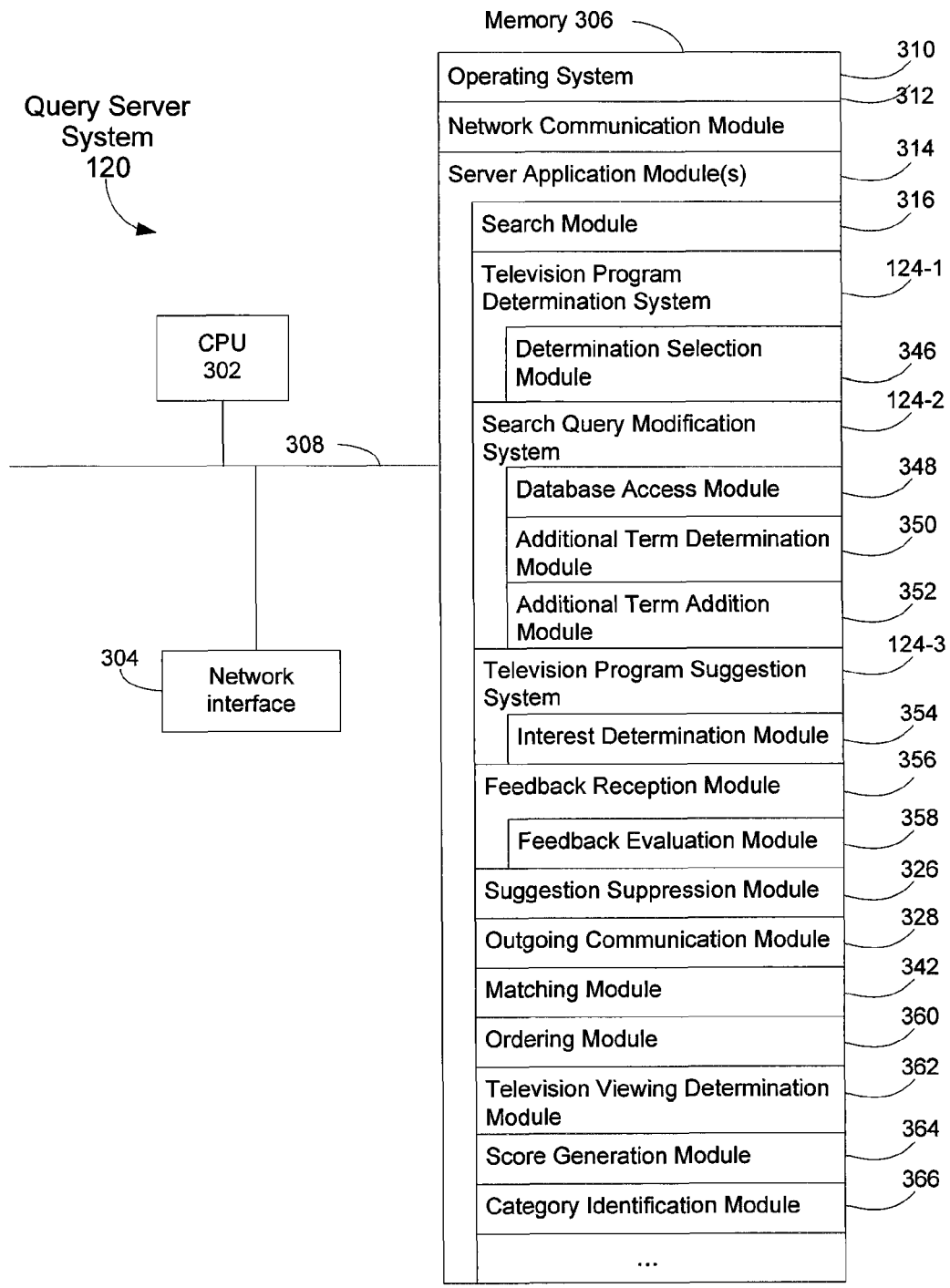
FIG. 3A is a block diagram illustrating a query server system, in accordance with some implementations.
Figure 3B:
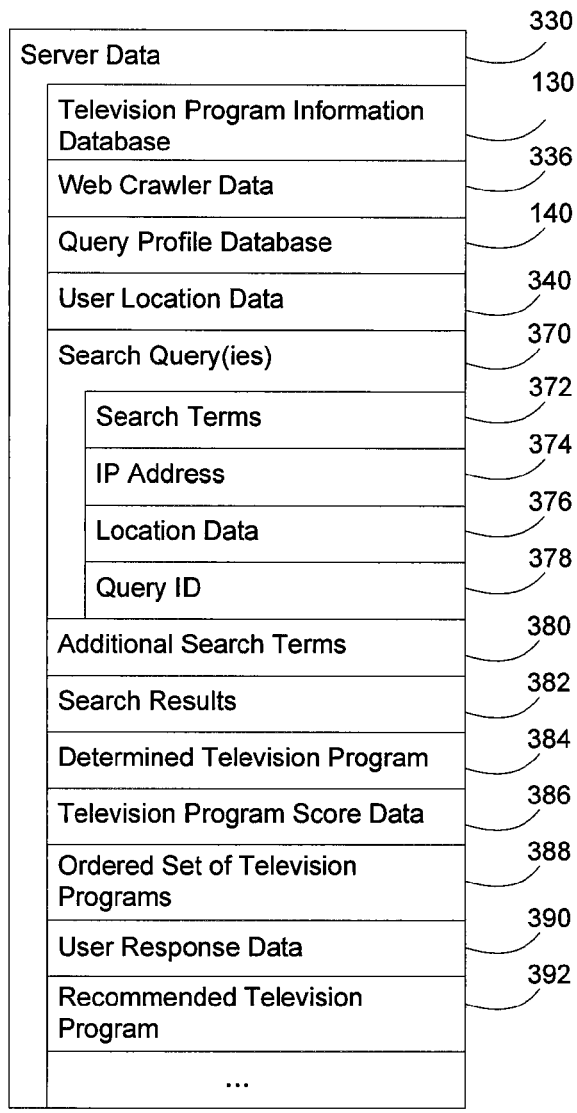
FIG. 3B is a block diagram further illustrating the memory of a query server system memory, in accordance with some implementations.
Figure 5:
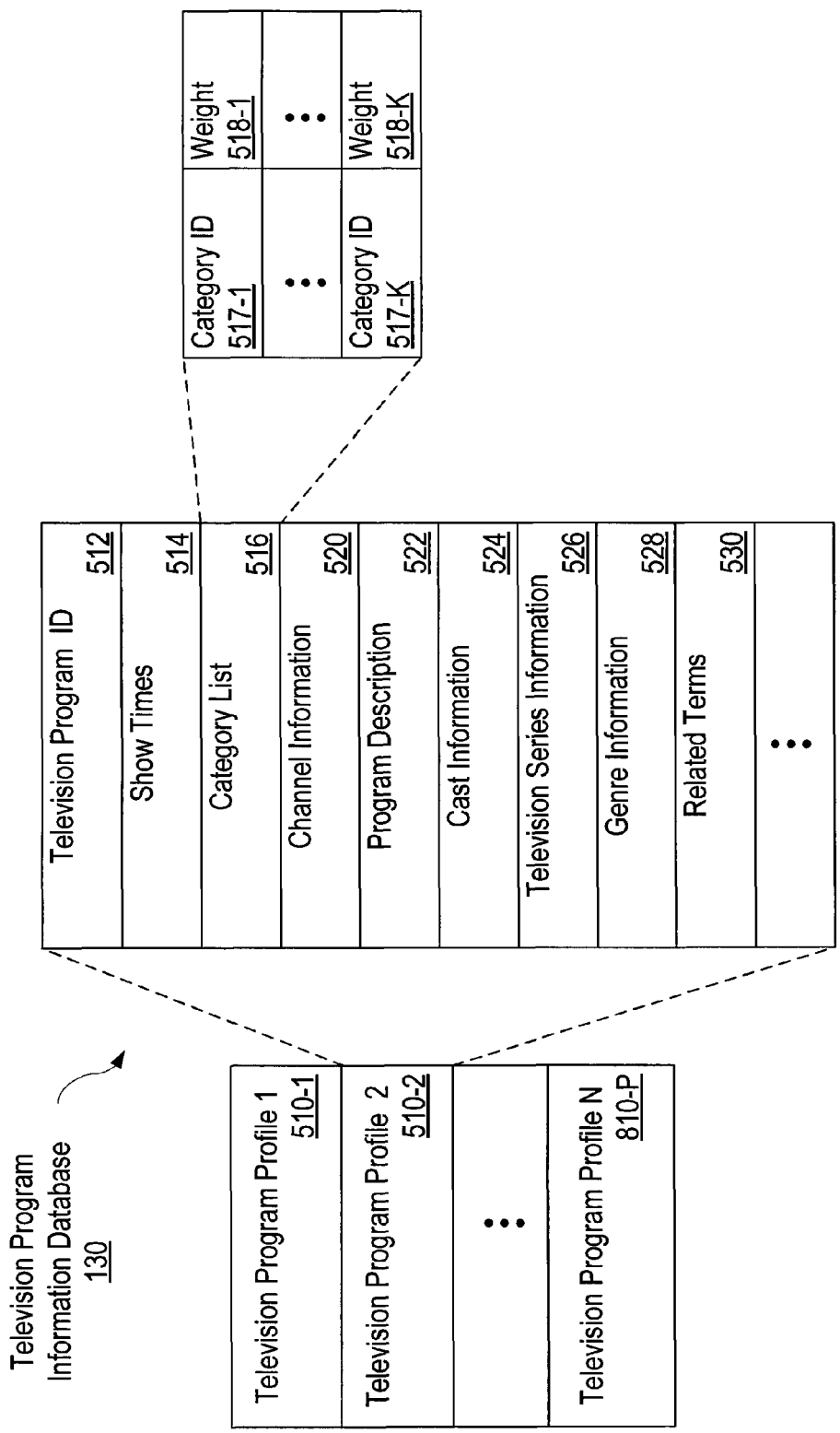
FIG. 5 is a block diagram of a data structure used by a television program information database to store information for a set of television programs in accordance with some implementations.
Figure 6:
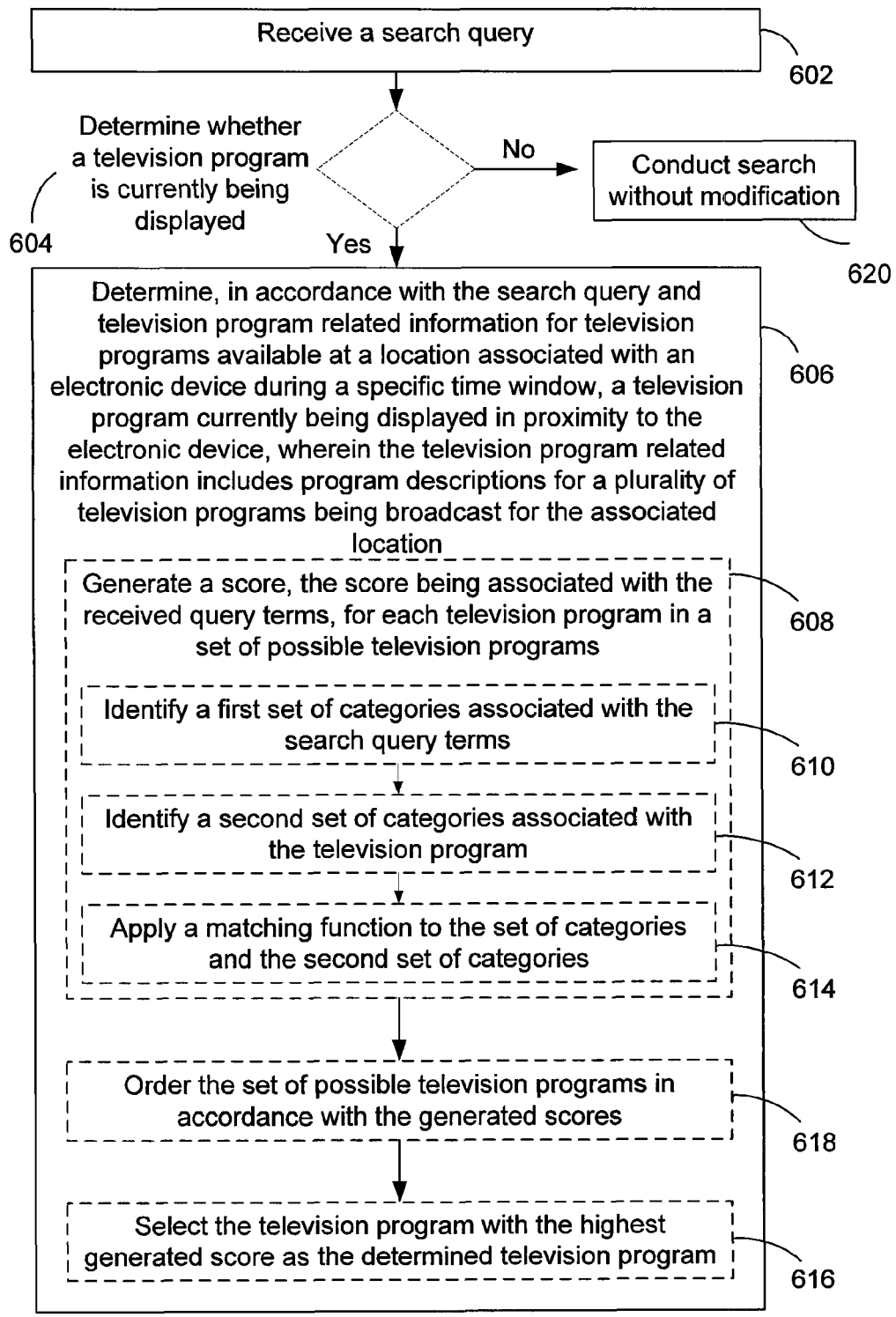
FIG. 6 is a flow diagram illustrating the process for determining a television program being watched by the user of a clients system, in accordance with some implementations.
Figure 7:
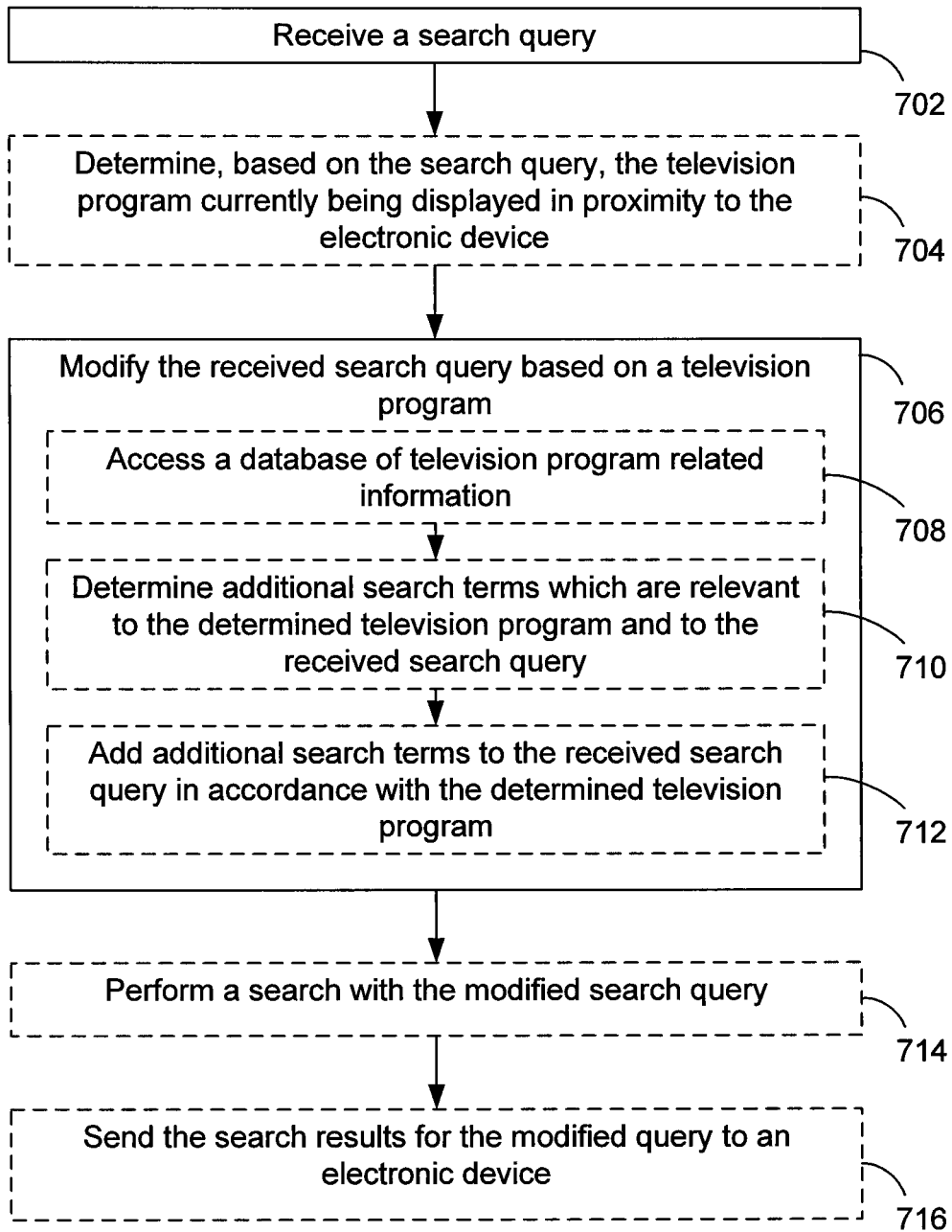
FIG. 7 is a flow diagram illustrating the process for enhancing a search based on a determined television program, in accordance with some implementations.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling the information generated by the operating system 216 and client applications 230 to be presented visually on the display 206;
- one or more client application modules 104 for handling various aspects of interacting with the query processing 120, including but not limited to: a browser application 224 for sending queries to and receiving results from the query processing server 120;

a client data module 230, for storing data relevant to the clients, including but not limited to client location data 232, client IP address data 234 and client profile data 236;

FIGS. 3A and 3B are block diagrams illustrating a query server system The query server system 120 typically includes one or more processing units (CPU's) 302, one or more network or other communications interfaces 304, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the query server system 120 to other computers via the one or more communication network interfaces 304 (wired or wireless) and one or more communication networks, such as the Internet, other wide area networks, local area networks, metropolitan area networks, and so on;
- one or more server application modules 314 for performing the services offered by the query server system, including but not limited to:
    - a search module 316 for receiving a search query from a client system 102, (FIG. 1), determining results related to the search query, ordering the results in accordance with the search query and returning the determined results to the client system 102 (FIG. 1).
    - a television program determination system 124-1 for receiving a search query 112 from the search module 316, determining, based on the data in search query profile database 140, the user location data 340, and the information in the television program information database 130, whether the user of a client system 102 (FIG. 1) is currently viewing a television program, and in accordance with a determination that the user of a client system is currently viewing a television program, determining, based on the data in search query profile database 140, the user location data 340, and the information in the television program information database 130, which television program the user of a client system 102 (FIG. 1) is currently viewing, the method for determining is shown in more detail in FIG. 6, the television program determination system including but not necessarily limited to:
        - a determination selection module 346, for selecting a determined television program from a ordered set of possible television programs;
    - a search query modification system 124-2 for modifying the search query 112 based on the determined television program 340, the data in search query profile database 140, and the information in television program information database 130 returning the modified search query to the search module 316; including but not limited to:
        - a database access module 348 for accessing a television program information database and a query database;
        - an additional term determination module 350 for determining additional terms relevant to a received search query, the method for determining additional terms is more clearly explained in FIG. 7,
        - an additional term addition module 352 for adding additional terms to the received search query;
    - a television program suggestion system 124-3 for receiving a search query from the search module 316, determining, based on the data in search query profile database 140, the user location data 340, and the information in the television program information database 130, at least one program available to the user of the client system 102, and sending the determined television program to the user of the client system 102, including but not limited to
        - an interest determination module 354 for determining categories relevant to a user's interests;
    - a feedback reception module 324 for receiving feedback from the user of a client system 102; and
    - a suggestion suppression module 326 for suppressing future suggestions depending on the feedback received by the feedback reception module 324;
    - an outgoing communication module 328, for sending communications to the client, the communications including, in accordance with some implementations, search results and television program recommendations;
    - a matching module 342, for applying a matching functions to one or more lists of categories;
    - an ordering module 360, for ordering sets of television programs;
    - a television viewing determination module, for determining whether a user of a client system 102 is currently viewing a television program;
    - a score generation module 364 for generating a score for one or more television program in a set of television programs; and
    - a category identification module 366 for identifying categories associated with search queries and television programs;
- server data 330, holding data related to the query server system 120, including but not limited to:
    - television program information database 130, including television program profiles, (as described in more detail in FIG. 5); wherein television program profiles store metadata about the television programs, the metadata including time, channel, show title, show description, series id, cast, category list information, and genre;
    - web crawler data 336, including information stored by a web crawler concerning documents available over a network;
    - query profile database 140; including query profiles (as described in more detail in FIG. 4) for determining categories related to search queries;
    - user location data 340, including both the physical location of the user and the IP address of the client system (102, FIG. 1);
    - one or more search queries 370, the search queries including search terms 372, the IP address 374 of a user of a client system 102, the location data 376 associated with the user of a client system (102, FIG. 1), and a query ID 378 associated with the search query;

one or more additional search terms 380, determined by the additional term determination module 350, for addition to the search query;

search results 382 associated with the received search query, determined by the search module 316;

one or more determined television programs 384, determined by the television program determination system 124-1;

television program score data 386, generated by the score generation module 364, for comparing television programs to search queries;

an ordered set of television programs 388, ordered by the ordering module 360, for ranking television programs;

user response data 390, received from the user of a client system 102, for indicating a user's response to a recommended television program; and a recommended television program 392 for sending to the user of a client system (102, FIG. 1).

Figure 4:
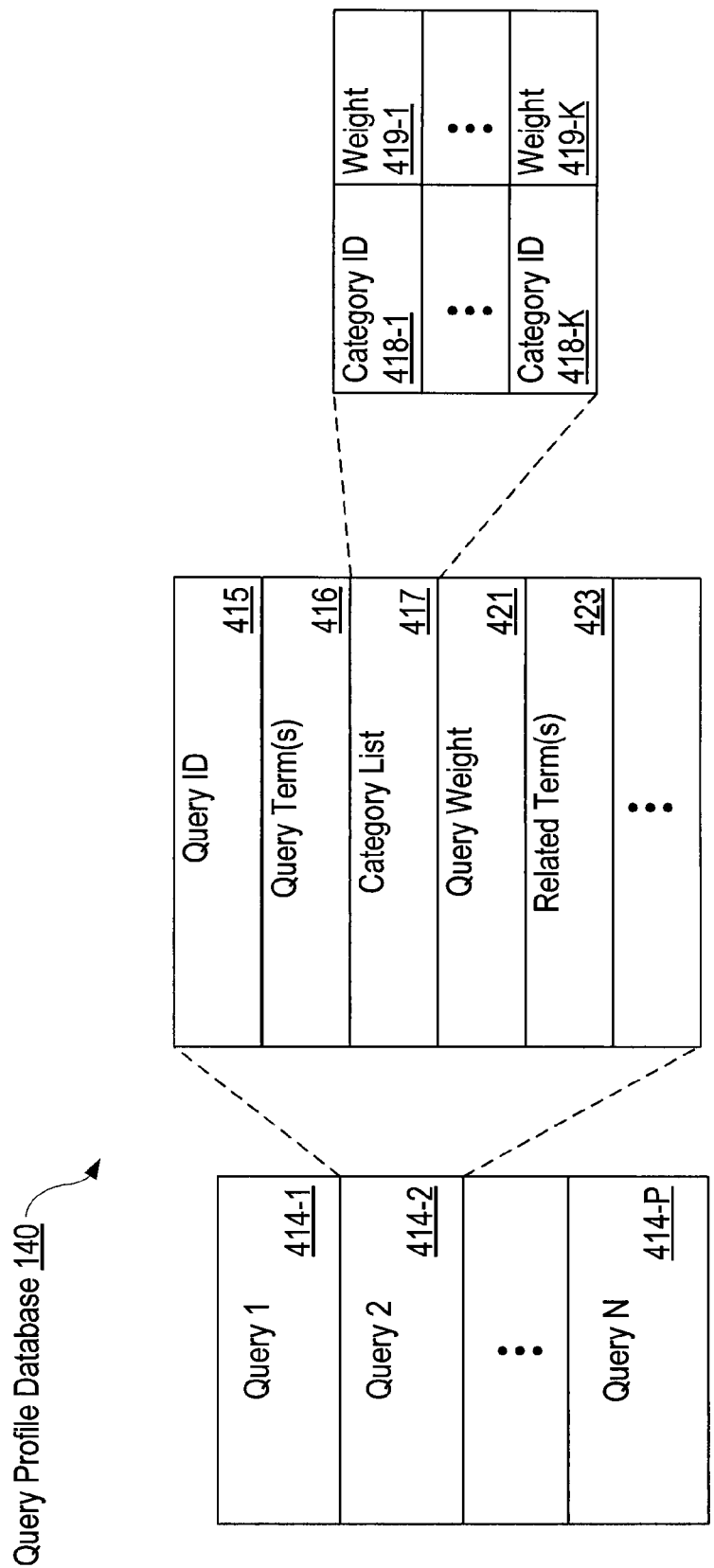
FIG. 4 is a block diagram of a data structure used by a query profile database to store information for a set of query profiles in accordance with some implementations.

FIG. 4 depicts a block diagram of an exemplary data structure for the query profile database 140 for storing query profiles in accordance with some implementations. In accordance with some implementations, the query profile database data structure 140 includes a plurality of query profile records 414-1 to 414-P, each of which corresponds to a user-submitted query. When the same query is submitted by many users, a single query profile 414 stores profile information for the query. In some implementations, each query profile record 414 contains a query ID 416 that identifies a particular query, the set of corresponding query terms 416 in the query, and a category list 420 for classifying the query. In some implementations, the query profile also includes one or more related terms 426, associated with the search query.

In some implementations, members of the category list 417 include one or more category/weight pairs (category ID 422, weight 424). The category ID 422 may correspond to a particular type of information such as news, sports, travel, finance, etc., and the weight 424 is a number that measures the relevance between the query and the corresponding type of information. For example, the query term "golf" may have relatively high weights for the categories of sports and sporting goods, but a low weight for the category of information technology (IT). In some implementations, the category ID 420 corresponds to a "concept cluster," which may be produced by a clustering process for example, which may or may not be easily labeled with a category name.

In some implementations described below, individual query profiles 414 are generated, used and then disposed of without storing the query profiles in a database or other collective data structure. In some implementations, individual query profiles and their associated categories lists are generated through natural language processing. While conducting natural language processing on a corpus of a text to generated a query profile, the query search server (120, FIG. 1) ignores uninteresting words which appear frequently across all writings, such as "a" or "the." Instead, the query server system (120, FIG. 1) focuses on more important words like words identifying people, places, and products, also known as interesting entities. By restricting the search space to interesting entities, the query search system reduces both the time needed to generate the individual query profiles and the time needed for data look up if the profiles are stored in a database.

In some implementations, the query server system (120, FIG. 1) accesses the query profile database 140 to determine categories associated with a given query. For example, if the search query received was "Jaguar," the query profile category list may include "automobiles," "mammals," and "sports." The various search enhancement systems (see FIG. 1, 124) then use this category information to calculate the degree to which the submitted search query correlates to various television program profiles (as discussed further in FIG. 5). This process is described more fully with respect to FIGS. 6, 7, and 8. This correlation information is used to either determine a television program currently being watched by the user, modify the terms of the search query or suggest a television program of interest to the user based on this information.

FIG. 5 depicts a block diagram of an exemplary data structure for the television program information database 130 for storing television program profiles 510 in accordance with some implementations. The database data structure 130 includes a plurality of television program profile records 510-1 to 510-P, each of which corresponds to a specific television program. In some implementations, each television program profile record 510 contains television program metadata, including television program ID 512 that identifies a particular television program, the set of corresponding show times (a set of times, each time corresponding to one period during which the television program is broadcast) 514, a category list for classifying the television program 516, channel information 520, a program description outlining the content of the television program 522, cast information 524, television series information 526, and genre information 528. In some implementations, the television program profile also includes one or more related terms 530, associated with the television program.

In some implementations, members of the category list 516 include one or more pairs of (category ID 517, weight 518). The category ID 517 may correspond to a particular type of information such as news, sports, travel, automobiles, etc., and the weight 518 is a number that measures the relevance between the television program and the corresponding type of information. For example, the television program "Top Gear" may have relatively high weights for the category of sports cars and auto racing, but a low weight for the category of aircraft. In some implementations, the category ID 517 corresponds to a "concept cluster," which may be produced by a clustering process for example, which may or may not be easily labeled with a category name. In accordance with some implementations the television program category list 516 data, including the television program profiles, is used in conjunction with the query profile category lists 417 to determine currently watched television shows, modify search queries, and suggest television programs for a user to watch, as described in FIGS. 6, 7, 8, and 9.

In some implementations described below, individual television program profiles 510 are generated, used and then disposed of without storing the television program profiles in a database or other collective data structure 500. In some implementations, individual television program profiles and their associated categories lists are generated through natural language processing. While conducting natural language processing on a corpus of a text to generated a television program profile, the query server system (120, FIG. 1) ignores uninteresting words which appear frequently across all writings, such as "a" or "the." Instead, the query server system (120, FIG. 1) focuses on more important words like words identifying people, places, and products, also known as "interesting entities." By restricting the search space to "interesting entities", the query search system reduces the time needed to generate the individual television program profiles and reduces the time needed for data look up if the profiles are stored in a database.

Television Program Determination

FIG. 6 is a flow diagram illustrating a process for determining a television program being watched by the user of a client system or displayed in proximity to an electronic device used by a TV viewer, in accordance with some implementations. Note that "determining" a television program includes predicting a television program that is being displayed in proximity to an electronic device based on circumstantial information available at a server, including search queries issued to the server from the electronic device and information on TV programs being broadcast during or nearby a time window when the search query was received. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the television program determination system 124-1 (FIGS. 1 and 3).

In accordance with some implementations, the query server system 120 (FIG. 1) receives a user's search query from an electronic device, wherein the user/electronic device has an associated location (602). The location associated with the user/electronic device can be determined in by a variety of methods. For example, the location maybe supplied by user input, stored in a user profile locally or remotely, or stored on the user's electronic device by the GP S/location application located in the electronic device 207 (FIG. 2). In accordance with some implementations, the query server system 120 (FIG. 1) also determines the location of a user's electronic device in accordance with the IP address associated with the user's electronic device. In some implementations, location information associated with the user of an electronic device may be stored either at the client device or at the query server system.

In accordance with some implementations, the query server system passes the search query to a television program determination system 124-1 (FIG. 1). The television program determination system 124-1 (FIG. 1) determines, in accordance with the search query profile stored in the query profile database 140 (FIG. 1) associated with the received search query and the television program profiles stored in the television program information database 130 (FIG. 1) for television programs available to the user/electronic device during a specific time window, a television program currently being displayed in proximity to the electronic device, wherein the television program related information includes program descriptions for a plurality of possible television programs available at the associated location (606). The phrase, "displayed in proximity to the electronic device" or similar is understood to mean displayed in the same room as the electronic device or otherwise within viewing and/or hearing range of the electronic device, such that the TV program is displayed for, viewed by, or otherwise discernable by a user of the electronic device (even if only through hearing). The method for determining is described in greater detail below.

In accordance with some implementations, the determination is made by generating a score for each television program in the plurality of television programs, the score being generated in accordance with the query terms received from the user of an electronic device (608). In some implementations, the television program with the highest score is the determination made by the determining module of the query server system (616).

In some implementations, the query server system generates the score by identifying a first set of categories associated with the search query terms (610). In some implementations, the query server system dynamically determines the first set of categories associated with the search query terms. In some implementations, the query server system determines the first set of categories associated with search query terms in advance and stores the first set of categories in a query profile associated with the query in the query profile database (140 FIG. 1). If the first set of categories is determined in advance, the query server system retrieves the query profile from the query profile database. The query server system then identifies a second set of categories associated with each television program (612). In some implementations, the categories associated with each television program are determined through a textual analysis of all information stored in the television program information database 130 (FIG. 3) such as the television program name, program descriptions, cast information, television series information, genre information and related terms. In addition, in some implementations information is retained based on user interests and television program selection habits and this information is used to further establish category information for each television program. In some implementations, the query server system dynamically determines the second set of categories associated with each television program. In other implementations, the query server system may determine the second set of categories associated with each television program prior to receiving the search query in advance and store the second set of categories associated with each television program in a television program information database 130 (FIG. 1) for later retrieval.

In accordance with some implementations, the query server system applies a matching function to the first set of categories and the second set of categories to obtain a score (614). The matching function applied by the query server system can be any function or algorithm that calculates the similarity between to two sets. In some implementations, the score generated for each television program in a plurality of television programs is a correlation co-efficient. For example, if a user were to enter the search query "eagles" the query server system will likely to find categories for 'eagles' such as 'music' and 'outdoors.' A documentary on The Eagles, will then be found to have a significant correlation to the search query and will receive a relatively high score. If the user then confirms they are viewing this television program that information may be fed back into the television program information database for future classification.

Optionally, prior to determining a television program being currently viewed by the user of a client system, the query server system may determine whether the user is, in fact, currently viewing a television program (604). The query server system analyzes the content of the received query, as well as the location of the user of the electronic device and the time at which search query was received to make this determination. In some implementations the query server system makes this determination by calculating a correlation score (see above for methods of calculating a score correlating search queries and television programs) for one or more television programs available to the user of the electronic device based on the location information stored at the server. If at least one television program exceeds the predetermined threshold, then one determined television program will be determined as outlined above. However, if none of the correlation scores exceed a predetermined threshold, the query server system determines that the user of an electronic device is not currently viewing a television program. In accordance with some implementations, if the query server system determines that the user of an electronic device is not currently viewing a television program, the query server system 120 (FIG. 1) executes a search through the web crawler data (see FIG. 3, 336) using the received search query with no modification (620).

In accordance with some implementations, the query server system orders the set of possible television programs in accordance with the generated scores (618).

Television Program Based Search Expansion

FIG. 7 is a flow diagram illustrating a process for enhancing search results in accordance with a determined television program, in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the operations shown in FIG. 7 are performed by the search query modification system 124-2 (FIGS. 1 and 3).

In accordance with some implementations, a query server system 120 (FIG. 1) receives a search query from a user of an electronic device (702). The query server system then determines, based on the search query, the television program the user is currently watching (704). A method for determining a television program based on a search query is illustrated in FIG. 6. In some implementations, the television program is determined by the server directly accessing information concerning the television program being displayed in proximity to the electronic device. For example, the server system can determine the program being displayed in proximity to the electronic device by accessing a device (e.g. a set top box, an Internet-enabled television system, or a home media computing device) that stores information concerning the television channel or television program currently being displayed to a user.

In accordance with some implementations, the query server system 120 (FIG. 1) modifies the received search query based on the determined television program (706). In some implementations, as one method of modifying the received search query, the query server system 120 (FIG. 1) accesses a database of television program related information (708). In some implementations, the television program related information includes information related to program show times, channel information, program title, program description, program series information, cast information and genre information. The query server system 120 (FIG. 1) then determines additional search terms which are associated with both the determined television program and the received search query (710). The query server system 120 (FIG. 1) adds the additional search terms to the received search query (712).

In some implementations, determining additional terms to modify the received search query is accomplished by first determining categories related to the received search query, from a search query profile 417 (FIG. 4), determining categories related to the determined television program, from a television program profile 516 (FIG. 5) associated with the determined television program, and comparing the set of categories associated with the received search query and the set of categories associated with the determined television program. Based on the categories which correlate, the search query modification system 124-2 (FIG. 1) finds relevant additional search queries. For example, if the received search query was "F550" and the determined television program was "Top Gear," a television program about cars, the search query modification system 124-2 (FIG. 1) determines that both the received search query and the determined television program are associated with the category "sports cars" and, more specifically, the Ferrari F550. Based on this determination, the search query modification system 124-2 (FIG. 1) determines that "Ferrari" is a relevant search query term and modifies the received search query to include it.

In accordance with some implementations, the search server system 120 (FIG. 1) performs a search with the modified search query (714). The query processing server uses the modified search query to search through the web crawler data (see FIG. 3, 336) previously gathered, indexed, and stored by the query server system. The search server system 120 (FIG. 1) then returns the search results of the modified search query to the electronic device (716).

Television Program Suggestions Based on Search Query

Figure 8:
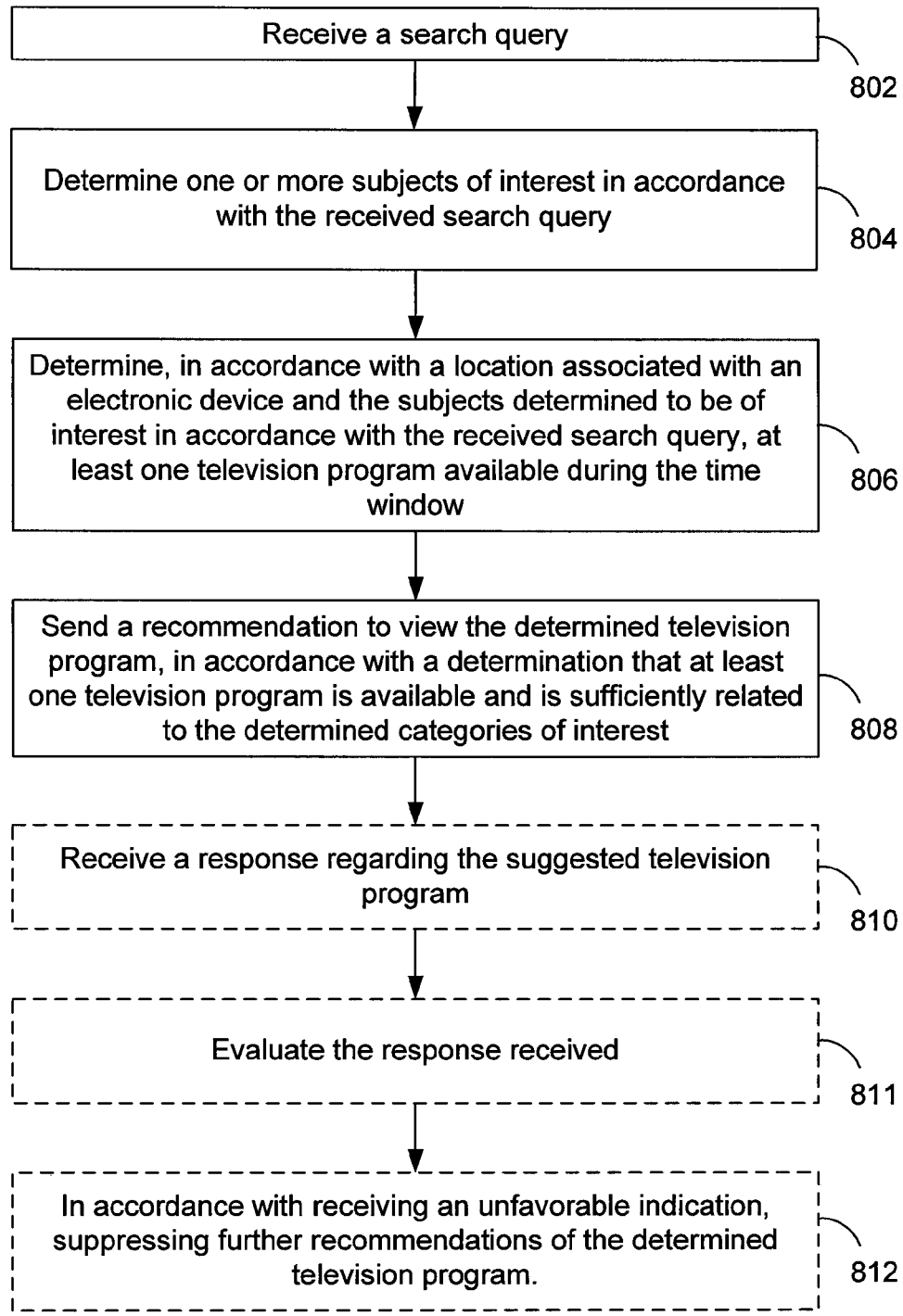
FIG. 8 is a flow diagram illustrating the process for suggesting a currently available television program to the user of a client system, in accordance with some implementations.

FIG. 8 is a flow diagram illustrating the process for suggesting a television program in accordance with a received search query, in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the operations shown in FIG. 8 are performed by television program suggestion system 124-3 (FIGS. 1 and 3).

In accordance with some implementations, the query server system 120 (FIG. 1) receives a user's search query from an electronic device (802). The search server system 120 (FIG. 1) then determines one or more subjects of interest to the user of the electronic device in accordance with the received search query (804). In some implementations, the query server system 120 (FIG. 1) determines subjects of interest to the user of an electronic device by identifying a first set of categories associated with the received search query terms. In some implementations, the query server system 120 (FIG. 1) dynamically determines the first set of categories associated with the search query terms. In some implementations, the query server system 120 (FIG. 1) determines the first set of categories associated with search query terms in advance and stores the first set of categories associated with a search query in a query profile database for later retrieval 140 (FIG. 1).

In accordance with some implementations, the search server system 120 (FIG. 1) determines, in accordance with the location associated with the user of an electronic device and the subjects determined to be of interested to the user in accordance with the received search query, at least one television program available during the time window (806). In some implementations, the query server system 120 (FIG. 1) makes this determination by identifying a second set of categories associated with each television program from a set of television programs. The query server system 120 (FIG. 1) then applies a matching function to compare the first set of categories associated with the search query terms and the second set of categories associated with each television program in the set of television programs. In some implementations the query server system 120 (FIG. 1) dynamically determines the second set of categories associated with each television program. In other implementations, the query server system 120 (FIG. 1) determines the second set of categories associated with each television program in advance and stores the second set of categories associated with each television program in a television program information database 130 (FIG. 1).

In accordance with some implementations, the television program suggestion system 124-3 (FIG. 1), generates a score for each television program from the set of currently available television programs. In some implementations, the score is generated by applying a matching function to the first set of categories associated with the received search query and the second set of categories associated with each television program from the set of currently available television programs. For example, a search query of "jaguar" may have the following set of categories associated with it (mammals, sports cars, sports teams.) A television program such as "America's Next Top Model" may have the following set of associated categories (fashion, models, clothing design). A matching function, such as a dot product, would likely find little to no correlation between the two television programs and thus the resulting score would be very low. However, a television program such as "Top Gear" may have the following set of associated categories (automobiles, sports cars, racing cars). A dot product of the set of categories for "jaguar" and "Top Gear" would produce more correlation that for "America's Next Top Model" and thus would produce a higher resulting score In accordance with some implementations, the set of available television programs is ordered in accordance with the generated score. In some implementations, the television program recommended to the user of an electronic device is the television program with the highest generated score.

In accordance with some implementations, the query server system 120 (FIG. 1) sends the user/electronic device a recommendation to view the determined television program, in accordance with a determination that at least one television program is available to the user/electronic device and is sufficiently related to the determined categories of interest (808). In some implementations, if the query server system 120 (FIG. 1) determines that none of the television programs available during the specific time window are sufficiently related to the user's determined categories of interest, no recommendation is sent.

In accordance with some implementations, the query server system 120 (FIG. 1) receives a response from the user of an electronic device regarding the suggested television program (810). This response may indicate the user is already watching the suggested television program, the user has decided to watch the suggested television program or that the user is not interested in watching the suggested television program.

In some implementations, the query server system 120 (FIG. 1), evaluates the response received from the user of an electronic device (811). Based on the evaluation, the query server system 120 (FIG. 1) may determine that the response is either favorable or unfavorable to the recommendations. A favorable response would be received if the user chose to view the recommended television program. An unfavorable response would be received if the user indicates that the user is already watching the suggested television program, or is not interested in watching the suggested television program. In accordance with a response that indicates the user is already watching the suggested television program, or is not interested in watching the suggested television program, the query server system 120 (FIG. 1) suppresses future recommendations of the recommended television program (812).

Figure 9:
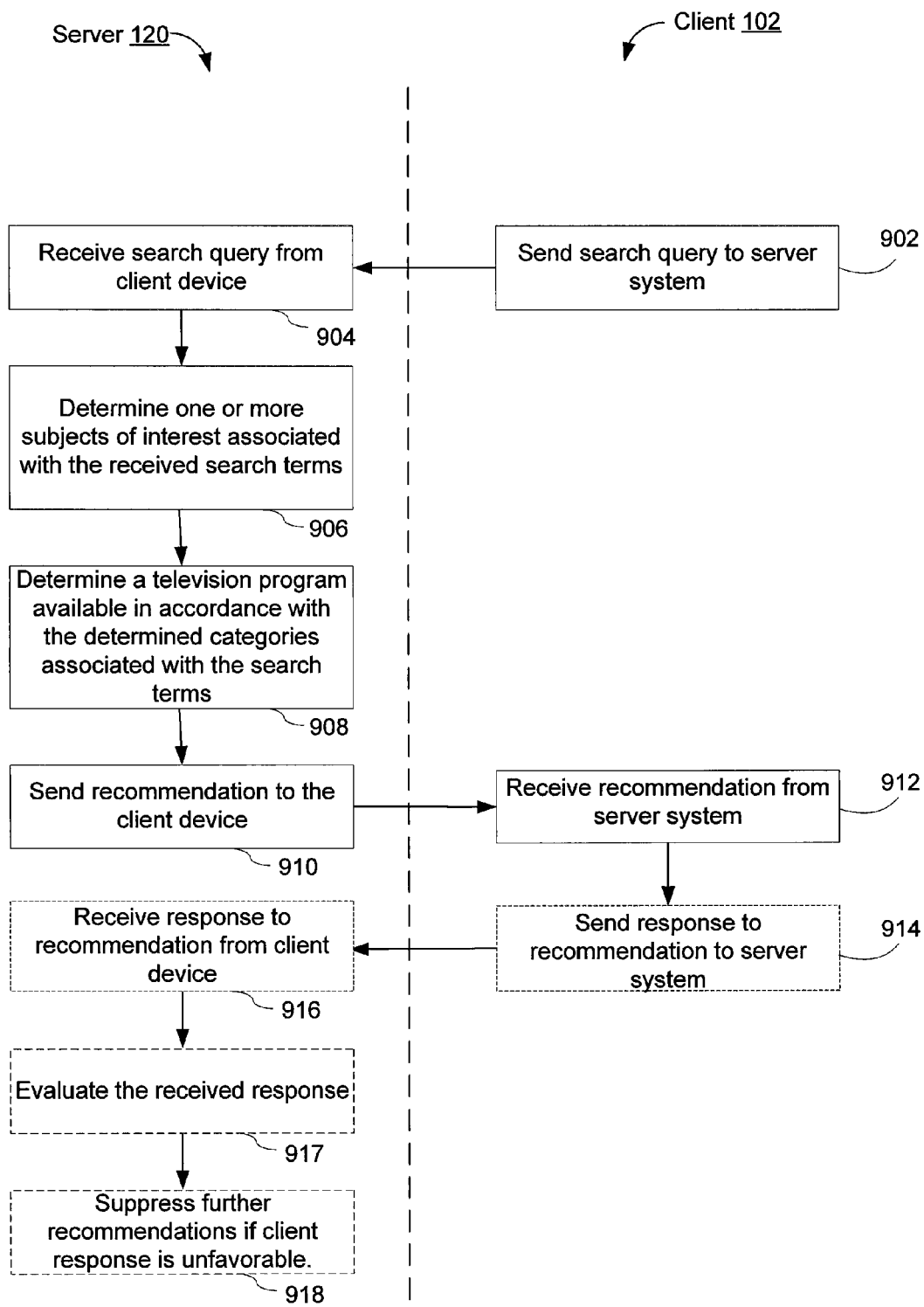
FIG. 9 is a flow diagram illustrating the communication between a client and a server system in accordance with some implementations.

FIG. 9 is a flow diagram illustrating the communication between a client 102 (FIG. 1) and a query server system 120 (FIG. 1) in accordance with some implementations. Each of the operations shown in FIG. 9 may correspond to instructions stored in a computer memory or computer readable storage medium. Optional operations are indicated by dashed lines (e.g., boxes with dashed-line borders).

In accordance with some implementations, the client device sends a search query to the server system (902). The query server system 120 (FIG. 1) receives the search query from the client device (904). The query server system (120, FIG. 1) determines one or more subjects of interest associated with the received search query (906). The query server system 120 FIG. 1) then determines a television program available to the user, in accordance with the determined categories associated with the search query (908). The query server system 120 (FIG. 1) then sends a recommendation for the determined television program to the client device (910). The client device receives the recommendation from the server system (912).

In accordance with some implementations, the user of the client device 102 (FIG. 1) responds to the recommendation and the client device sends the response to the server system (914). Optionally, the query server system 120 (FIG. 1) receives the response to the recommendation from the client device (916). The query server system 120 (FIG. 1) then evaluates the response from the client device (918). If the server system determines that the received response is unfavorable, the server system then suppresses further recommendation for the determined television program (920). An unfavorable response may include an indication that the user of a client device 102 (FIG. 1) is already watching the recommended television program or an indication that the user of a client device is not interested in the recommended television program.

Figure 10:
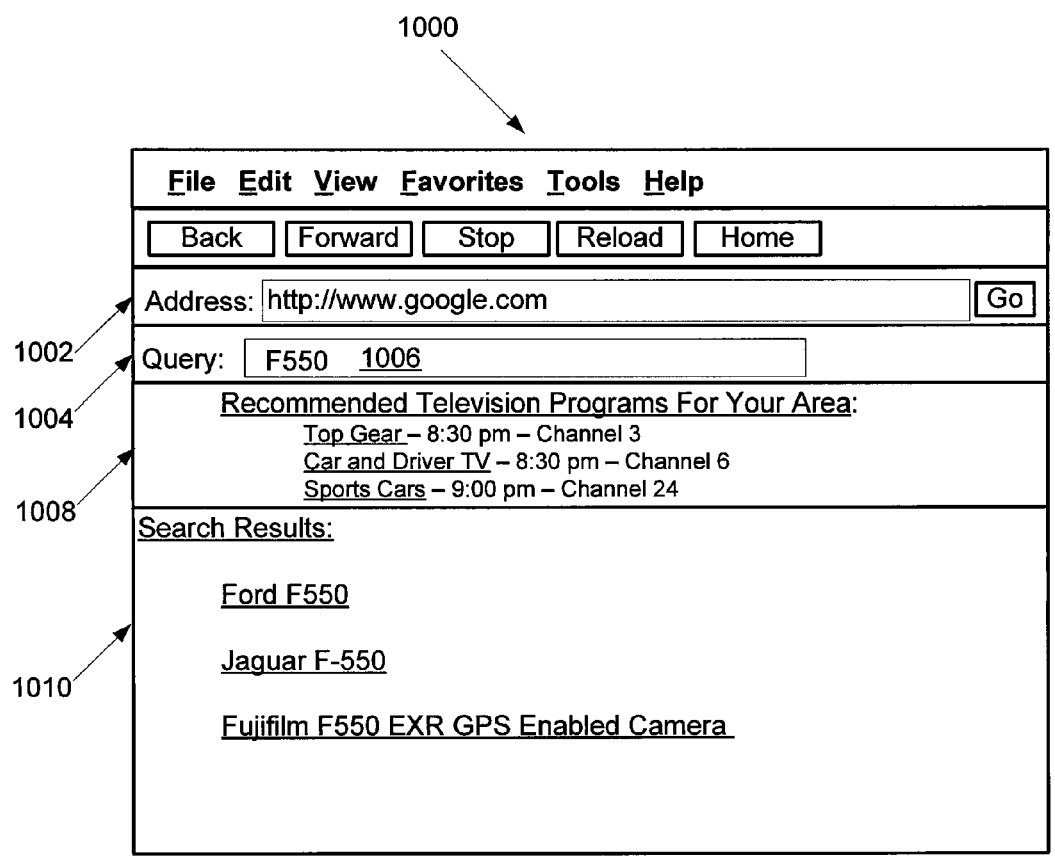
FIG. 10 depicts an exemplary user interface in accordance with some implementations.

FIG. 10 illustrates an exemplary user interface 1000 enabling a search requestor to enter a search query and receive television program recommendations and other search results on an electronic device 102 (FIG. 1). In this example, the user interface 1000 includes a browser window that includes a toolbar 1002 including a text entry box 1004. The example in FIG. 10 depicts a search query <F550> in text entry box 604. Shortly after user entry of the search query, the user interface displays a set of recommended television programs 1008 for the location of the user (see FIGS. 8-9 for a description of how the television programs are determined) and other search results 1010. In some implementations the page may also include other types of search results not pictured in FIG. 10 such as video results, image results, news results or shopping related search results associated with the entered search query.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for recommending TV programs based on search queries, the method comprising:
   at an Internet search engine:
   receiving from a personal electronic device distinct from a TV tuner one or more search terms during a time window;
   generating a set of general Internet search results responsive to the one or more search terms and determining one or more categories of interest based on the received one or more search terms;
   identifying a location associated with the personal electronic device;
   in accordance with the location, the categories of interest, and the one or more search terms, determining at least one related media program, distinct from the general Internet search results, from a plurality of media programs available during the time window;
   sending to the personal electronic device the general Internet search results and a recommendation to view the determined media program, including options selectable by the user to indicate a response to the recommendation, wherein the options include that the user is watching the recommended media program;
   receiving from a user of the personal electronic device a user response to the media program recommendation;
   determining that the user selected the option indicating that the user is watching the suggested media program; and
   in accordance with the determination, suppressing further recommendations of the recommended media program to the user from being sent to the personal device in response to subsequent general search queries to the Internet search engine.

2. The method of claim 1, wherein the suggested media program is available to watch at any time via a network connection.

3. The method of claim 1, wherein determining a media program for recommendation further includes accessing a media program information database for category information and availability information associated with the plurality of media programs.

4. The method of claim 1, wherein the time window begins at the time the one or more search terms are received and extends a predetermined amount of time into the future.

5. The method of claim 1, wherein the response is an affirmative response received from the user of the electronic device with respect to the suggested media program.

6. A server system, for recommending TV programs based on search queries, wherein the server system includes an Internet search engine, comprising:
   one or more central processing units for executing programs;
   memory storing one or more programs to be executed by the one or more central processing units;
   the one or more programs comprising instructions for:
   at the Internet search engine:
   receiving from a personal electronic device distinct from a TV tuner one or more search terms during a time window;
   generating a set of general Internet search results responsive to the one or more search terms and determining one or more categories of interest based on the received one or more search terms;
   identifying a location associated with the personal electronic device;
   in accordance with the location, the categories of interest, and the one or more search terms, determining at least one related media program, distinct from the general Internet search results, from a plurality of media programs available during the time window;
   sending to the personal electronic device the general Internet search results and a recommendation to view the determined media program, including options selectable by the user to indicate a response to the recommendation, wherein the options include that the user is watching the recommended media program;
   receiving from a user of the personal electronic device a user response to the media program recommendation;
   determining that the user selected the option indicating that the user is watching the suggested media; and
   in accordance with the determination, suppressing further recommendations of the recommended media program to the user from being sent to the personal device in response to subsequent general search queries to the Internet search engine.

7. The system of claim 6, wherein the recommended media program is available to watch at any time via a network connection.

8. The system of claim 6, wherein the response is an affirmative response received from the user of the electronic device with respect to the suggested media program.

9. A non-transitory computer readable storage medium storing one or more programs configured for execution by a computer system, the one or more programs comprising instructions for:
   receiving from a personal electronic device distinct from a TV tuner one or more search terms during a time window;
   generating a set of general Internet search results responsive to the one or more search terms and determining one or more categories of interest based on the received one or more search terms;
   identifying a location associated with the personal electronic device;
   in accordance with the location, the categories of interest, and the one or more search terms, determining at least one related media program, distinct from the general Internet search results, from a plurality of media programs available during the time window;

sending to the personal electronic device the general Internet search results and a recommendation to view the determined media program, including options selectable by the user to indicate a response to the recommendation, wherein the options include that the user is watching the recommended media program;

receiving from a user of the personal electronic device a user response to the media program recommendation;

determining that the user selected the option indicating that the user is watching the suggested media program; and in accordance with the determination, suppressing further recommendations of the recommended media program to the user from being sent to the personal device in response to subsequent general search queries to the Internet search engine.

10. The non-transitory computer readable storage medium of claim 9, wherein the suggested media program is available to watch at any time via a network connection.

11. The non-transitory computer readable storage medium of claim 9, wherein the response is an affirmative response received from the user of the electronic device with respect to the suggested media program.

* * * * *

UNITED STATES PATENT AND TRADEMARK OFFICE
CERTIFICATE OF CORRECTION

| | | |
|---|---|---|
| PATENT NO. | : 9,075,875 B1 | Page 1 of 1 |
| APPLICATION NO. | : 13/174482 | |
| DATED | : July 7, 2015 | |
| INVENTOR(S) | : Maddison | |

It is certified that error appears in the above-identified patent and that said Letters Patent is hereby corrected as shown below:

In the claims

Claim 6, column 18, line 40, delete "media; and" and insert -- media program; and --.

Signed and Sealed this
Seventeenth Day of November, 2015

Michelle K. Lee
*Director of the United States Patent and Trademark Office*